Oct. 6, 1925.  
E. H. McCLEASE  
FISHING TOOL  
Filed Nov. 6, 1924  
1,556,530  
4 Sheets-Sheet 2

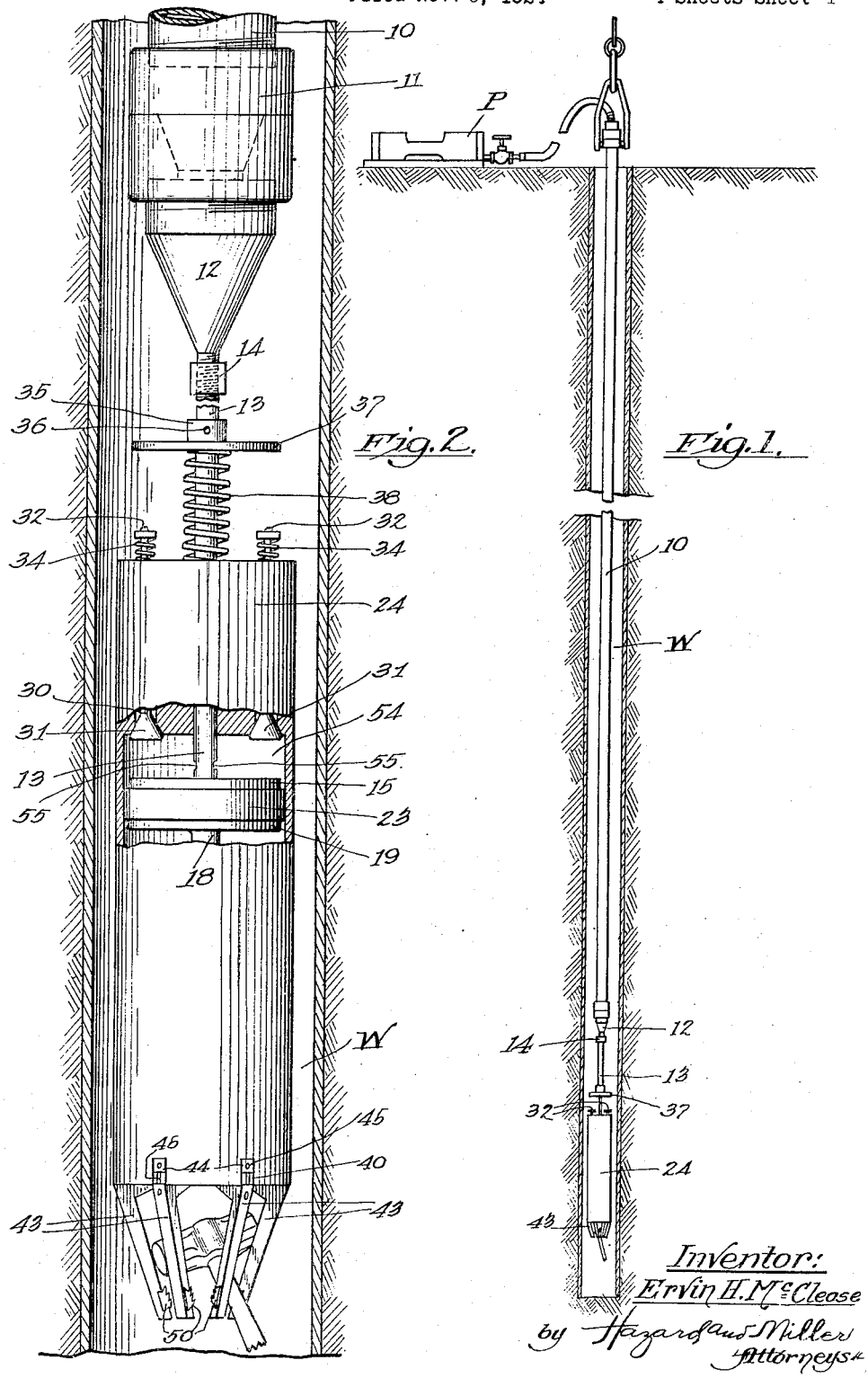

Inventor:  
Ervin H. McClease  
by Hazard and Miller  
Attorneys

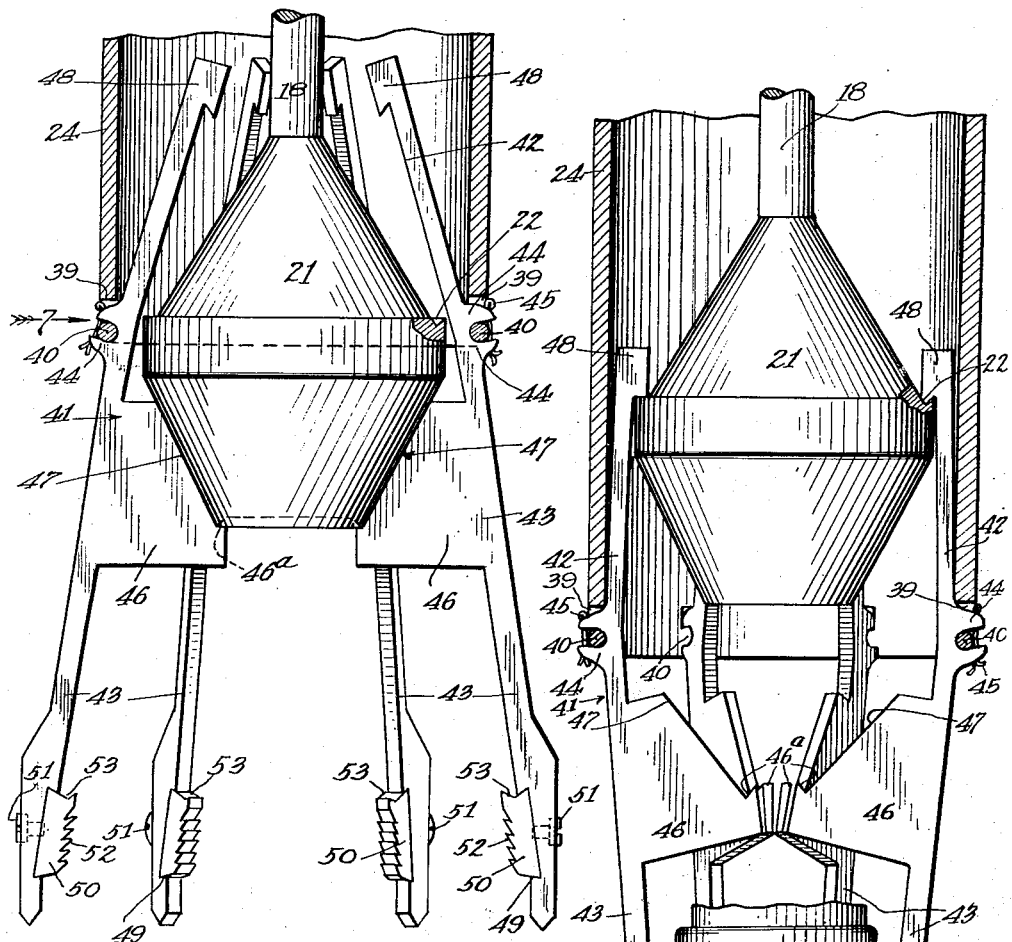
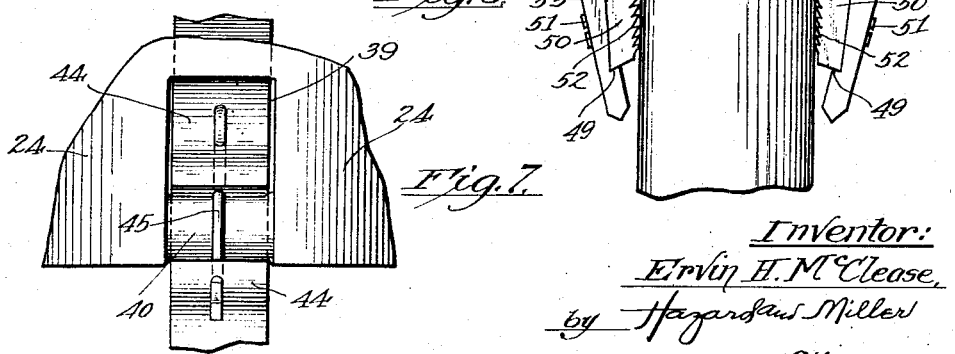

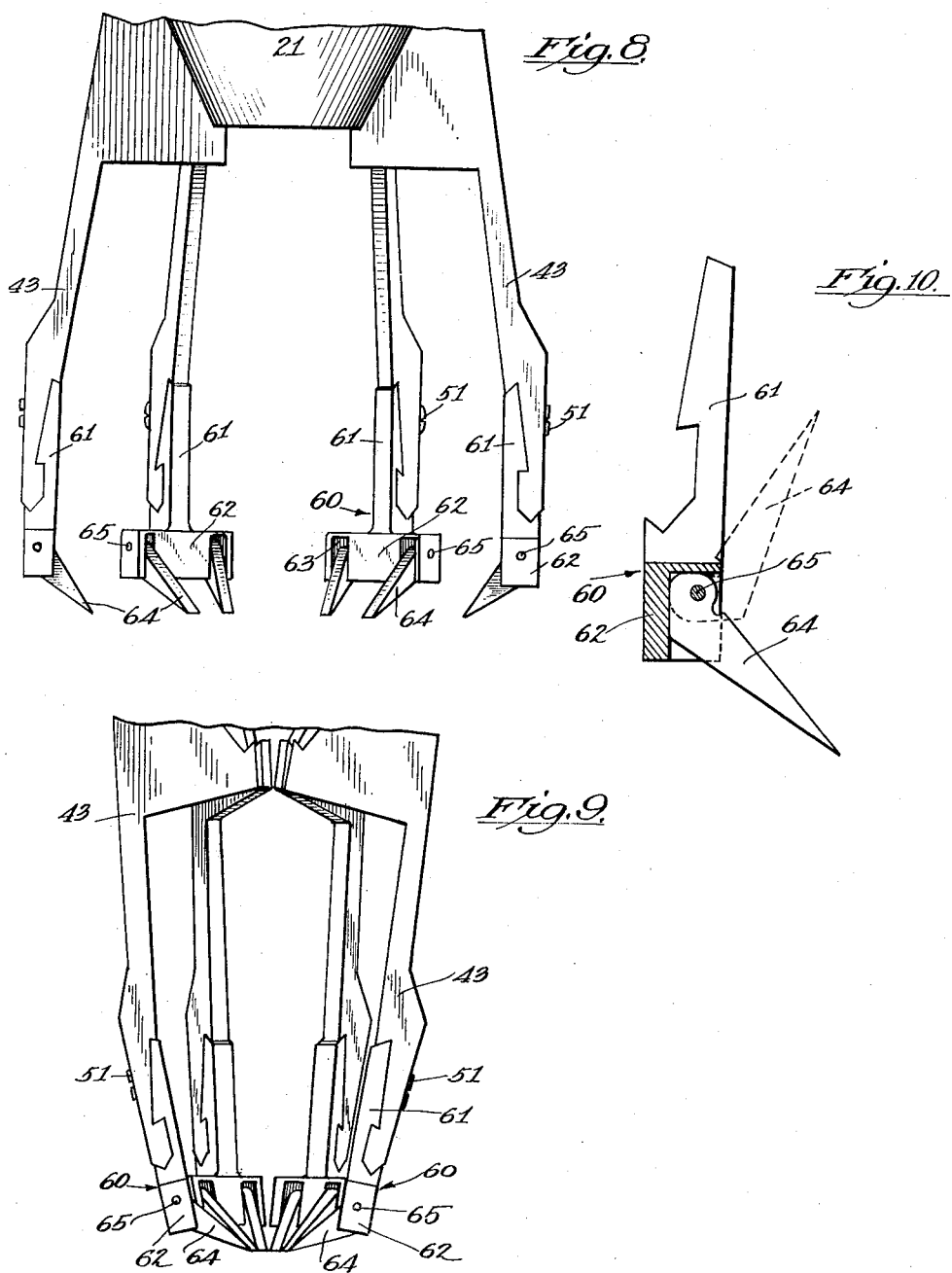

Patented Oct. 6, 1925.

1,556,530

UNITED STATES PATENT OFFICE.

ERVIN H. McCLEASE, OF LONG BEACH, CALIFORNIA, ASSIGNOR OF THIRTY-THREE AND ONE-THIRD PER CENT TO C. SHERIDAN BAILES, OF LONG BEACH, CALIFORNIA.

FISHING TOOL.

Application filed November 6, 1924. Serial No. 748,132.

*To all whom it may concern:*

Be it known that I, ERVIN H. MCCLEASE, a citizen of the United States, residing at Long Beach, in the county of Los Angeles and State of California, have invented new and useful Improvements in Fishing Tools, of which the following is a specification.

This invention relates to improvements in fishing tools.

It is an object of this invention to provide a fishing tool adapted to be lowered into a well so as to recover a fish, which fishing tool is capable of being lowered into the well with the fish engaging members in contracted position and, after having been lowered to approximately the position where the fish is supposed to be, may then have its fish engaging members expanded and contracted any number of times until the fish is encountered.

A further object of this invention is to provide a fishing tool capable of having its fish engaging members contracted and expanded any number of times within a well, which consists of a piston adapted to be connected to the lower end of a drill tube, which piston has a shell disposed thereabout and slidable thereon and which has a chamber formed therein above the piston into which fluid may be admitted from the drill tube so as to lift the shell with respect to the piston, thereby causing the fish engaging members carried by the shell to expand; and to provide spring means urging the shell downwardly with respect to the piston so as to cause the fish engaging members to contract upon a fish.

With the foregoing and other objects in view which will be made manifest in the following detailed description and pointed out in the appended claims, reference is had to the accompanying drawings for an illustrative embodiment of the invention, wherein:

Figure 1 is a vertical section through a well showing the improved fishing tool in applied position;

Fig. 2 is an enlarged vertical section through the well, showing the improved fishing tool after having engaged upon a fish, parts being broken away and shown in section;

Figure 3:
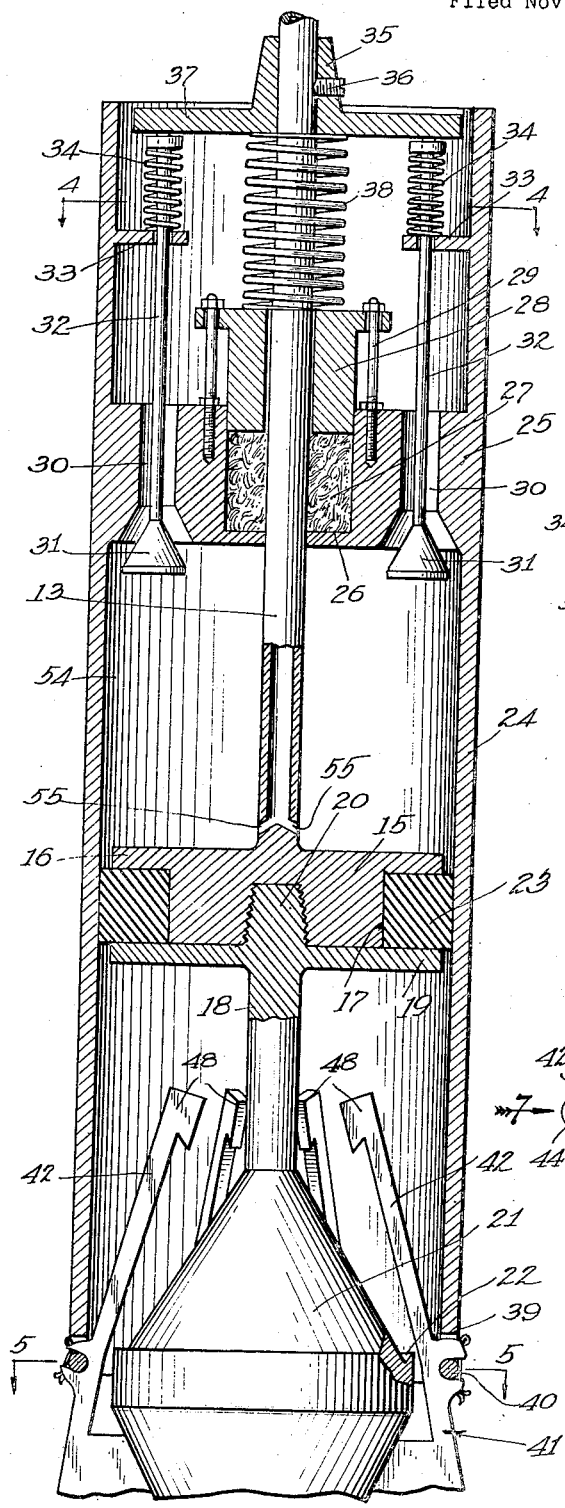
Fig. 3 is a vertical section through the improved fishing tool.
Figure 4:
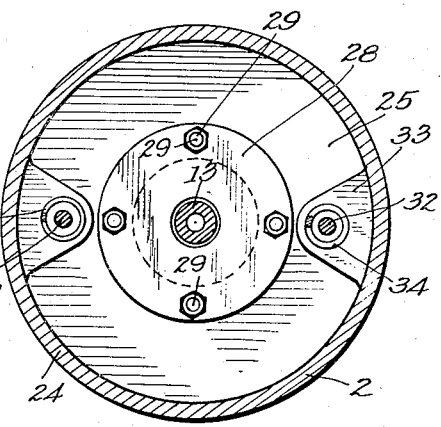
Figure 5:
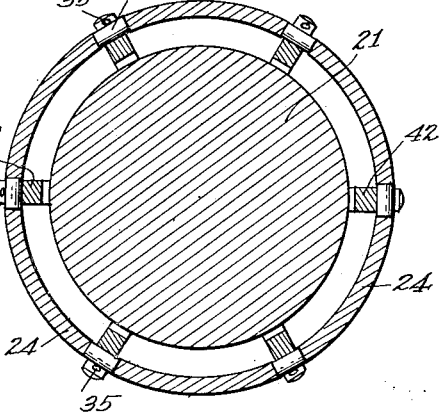

Fig. 3ª is a continuation of the lower portion of Fig. 3;

Fig. 4 is a horizontal section taken substantially on the line 4—4 of Fig. 3;

Fig. 5 is a horizontal section taken substantially on the line 5—5 of Fig. 3;

Fig. 6 is a view similar to Fig. 3ª, showing the fish engaging members as having been contracted upon a section of drill tube;

Fig. 7 is an enlarged view taken in the direction of the arrow 7 upon Fig. 5;

Fig. 8 is a view showing a set of fish engaging members of modified form;

Fig. 9 is a view showing the fish engaging members of modified construction in contracted position; and Fig. 10 is an enlarged section of one of the modified fish engaging members.

Referring to the accompanying drawings wherein similar reference characters designate similar parts throughout, the lower end of a string of drill tube 10 is provided with a collar or coupling 11, which is adapted to secure a reduced coupling 12 to the drill tube 10. A tube 13 is secured to the lower end of the reduced coupling 12 by means of a collar 14. This tube 13 has an enlargement 15 formed upon its lower end, which enlargement provides an annular flange 16 and a recess 17. A stem 18 has a flange 19 similar to the flange 16 formed thereon and is secured to the enlargement 15 by means of a threaded pin 20. The lower end of the stem 18 is provided with an enlargement 21, which constitutes a cam adapted to engage and actuate the fish engaging jaws. The enlargement 21 is in the form of two frustums of cones secured together base to base. An annular groove 22 is formed upon the enlargement or cam member 21 for a purpose hereinafter to be described.

Packing 23 is disposed within the recess 17 and held in position by means of the flanges 16 and 19. A shell or sleeve 24 is disposed about the piston formed by the enlargement 15, flanges 16 and 19 and the packing 23 and is slidable thereon. The shell 24 has its upper end closed by means of an internal annular shoulder 25, which shoulder fits around the tube 13 and has an annular recess 26 formed therein, in which packing 27 is adapted to be compressed by a gland 28, which is tightened by means of bolts 29. Ports 30 are formed in the shoulder 25 and are adapted to be closed by means of valves 31 which have stems 32 projecting upwardly through bosses 33 formed upon the interior of the shell 24. Coil springs 34 are disposed about the valve stems 32 and are compressed between the ends of the valve stems and the bosses 33.

A collar 35 is secured upon the tube 13 by means of a set screw 36 and this collar is provided with a flange 37 which is of a diameter smaller than the internal diameter of the shell 24. A coil spring 38 is disposed about the tube 13 and is compressed between the collar 35 and the gland 28 and serves to normally urge the shell 24 downwardly with respect to the piston. Adjacent the bottom of the shell 24, there are formed a plurality of apertures 39 which form spindles 40 upon the bottom of the shell 24. A plurality of fish engaging members generally designated at 41 are pivoted to the spindles 40. These fish engaging members 41 are provided with opposite arms 42 and 43, which arms are preferably out of alignment with each other, or in other words, have a slight angular relation to each other. A pair of bosses 44 are formed upon the back sides of each of the fish engaging members 41, which bosses 44 are disposed above and below the spindles 40. A suitable cotter key 45, or its equivalent, may be passed through the ends of the bosses 44 to secure the fish engaging members 41 upon the spindles 40. Projections 46 having inclined edges 47 are formed upon the arms 43 of each of the fish engaging members 41 and are adapted to engage the lower surface of the enlargement or cam member 21. As shown in Fig. 6, the projections 46 are provided with hooks 46ª which are adapted to engage the lower edge of the cam member 21, which has its bottom recessed as indicated in dotted lines upon Fig. 3ª. The upper end of the arms 42 of each of the fish engaging members 41 is provided with a hook 48, which hook is receivable in the annular groove 22 formed upon the enlargement or cam member 21. The lower end of each of the arms 43 of the fish engaging members 41 is preferably recessed, as at 49, to receive a shoe 50, which is held in position by means of a screw 51. Each of the shoes 50 has its face provided with a plurality of teeth 52 and has its upper end provided with a large tooth 53 forming a shoulder thereon.

The operation of the fishing tool is as follows: The well W is filled substantially full with fluid such as water or mud, and the fishing tool is then lowered into the well by means of the drill tube 10 with the fish engaging member 41 preferably in contracted position. After the drill tube 10 is lowered into the well, water or fluid may be supplied thereto by means of a pump P. When the fishing tool has been lowered to the approximate location of the fish, the pump P is caused to supply liquid to the drill tube 10 under a considerable pressure. The liquid in the drill tube 10 enters the chamber 54 formed within the shell 24 above the piston through the ports 55, which are provided in the tube 13 above the piston. The pressure of the fluid within the drill tube 10 and within the chamber 54 being greater than the pressure provided by the column of liquid within the well W causes the shell 24 to move upwardly with respect to the piston against the action of the spring 38. This upward movement of the shell 24 causes the projections 46 to engage the lower surface of the cam member 21, thereby causing the arms 43 of the fish engaging members 41 to assume an expanded position, as indicated in Fig. 3ª. When the shell 24 is in its uppermost position, as shown in Fig. 3, the upper ends of the valve stems 32 engage the flange 37 of the collar 35, causing the valves 31 to leave their seats formed upon the annular shoulder 25. Liquid may then pass from the chamber 54 through the ports 30 and into the well W. When it is desired to contract the fish engaging members 41, the pump P is disconnected from the drill tube 10, or is stopped, thereby relieving the pressure of the liquid within the drill tube 10 and within the chamber 54. As the column of liquid within the drill tube 10 is approximately equal to the column of liquid within the well W, the pressure of the liquid within the chamber 34 and within the well W about the shell 24 are approximately equal. The spring 38 is of sufficient strength to lift the column of liquid within the drill tube 10 a distance of about the length of two sections of drill tube or more. As the pressures within and without the chamber 54 are approximately equal, the spring 38 forces the shell 24 downwardly, thereby disengaging the upper ends of the valve stems 32 from the flange 37 and allowing the valves 31 to close. Upon downward movement of the shell 24, the fish engaging members 41 are moved downwardly and the arms 42 engage the cam member 21 thereby forcing the arms 42 outwardly or against the interior surface of the shell 24, thereby causing the arms 43 to assume a contracted position. The hooks 48 are received in the groove 22 and limit the downward movement of the shell 24 and the fish engaging members 41 with respect to the piston. If a fish has been encountered by the arms 43 carrying the shoes 50, the drill tube 10 may be lifted, drawing the fishing tool and the fish carried thereby out of the well W. If it is believed that a fish has not been encountered, the fish engaging members may be again expanded by again causing the pump P to apply pressure to the liquid within the drill tube 10. This causes the shell 24 to move upwardly with respect to the piston as before and upon relieving the pressure within the drill tube 10, the fish engaging members will again be contracted because of the fact that the shell 24 will be moved downwardly by the spring 38.

In Figs. 8, 9 and 10, a modified form of shoe is shown. This shoe consists of a T-shaped member 60 having a shank 61 adapted to be secured to the lower end of the arm 43 by means of the screw 51. The cross part 62 has a plurality of recesses 63 formed therein in which pointed dogs 64 are pivoted by means of pins 65. The pointed dogs 64 are adapted to swing upwardly and assume the position indicated by dotted lines in Fig. 10. It will be readily understood that if this type of shoe is employed, the fishing tool may be lowered over a fish and if the fish strikes any of the dogs 64, the dogs may swing upwardly, allowing the fish to pass thereby and then fall under gravity into the position shown by full lines in Fig. 10, so that when the fish engaging members 41 are contracted, a sort of basket is formed in which the fish is disposed, as shown in Fig. 9.

The provision of the valves 31 in the annular shoulder 25 serves two purposes. If the pressure generated within the drill tube 10 and the chamber 54 is considerably greater than the pressure within the well W, fluid may escape through the ports 30 and will prevent the higher pressure within the chamber 54 from injuring the fishing tool. A further advantage of providing the valves 31 and the ports 30 resides in the fact that frequently the mud in the bottom of the well W becomes quite thick and heavy before the fishing operation has begun. By permitting comparatively clean water to be discharged through the ports 30 into the surrounding mud, this mud will be caused to become thinned, and thus facilitate the operation of the fishing tool within the well. It will be understood that after a fish has been engaged by the fishing tool, and the drill tube 10 is being withdrawn, the level of the fluid within the drill tube will during the removal of the drill tube reach a higher level than within the well W. The spring 38 is designed to be of sufficient strength to counteract the effect of the additional head of fluid in the drill tube 10 over the level of the fluid within the well, so that the pressure generated by the additional head of fluid within the drill tube 10 will not be sufficient to cause the shell 24 to move upwardly with respect to the piston upon removal which would cause expansion of the fish engaging members 41 and the dropping or releasing of the fish.

It is contemplated within the scope of this invention to apply a suction pump to the upper end of the drill tube 10 so as to reduce the pressure of the fluid within the drill tube and thereby employ the pressure of the fluid within the well W for keeping the shell 24 in its lowermost position, thereby causing the fish engaging members 41 to stay in contracted position upon the fish while the complete device is being withdrawn from the well. In some cases, the application of a suction pump might be considered as necessary where the spring 38 is not very strong and where the weight of the fish is not great.

It will be understood that various changes in the detail of construction may be made without departing from the spirit or scope of the invention as defined by the appended claims.

I claim:

1. A fishing tool comprising a plurality of fish engaging members adapted to be connected to the lower end of a drill tube, hydraulic means for expanding said members while within a well, and means for contracting said members.

2. A fishing tool comprising a plurality of fish engaging members adapted to be lowered into a well by means of a drill tube, and hydraulically operated means for causing said fish engaging members to be expanded and then contracted upon a fish within the well.

3. A fishing tool comprising a piston adapted to be connected to a drill tube, a shell disposed about said piston having a closed top, thereby forming a chamber above said piston, means for admitting fluid from said drill tube to said chamber, thereby causing said shell to move upwardly with respect to said piston, fish engaging members carried by said shell, and means actuated by the upward movement of said shell for expanding said fish engaging members preparatory to contracting upon a fish.

4. A fishing tool comprising a piston adapted to be connected to a drill tube, a shell disposed about said piston having a closed top, thereby forming a chamber above said piston, means for admitting fluid from said drill tube to said chamber, thereby causing said shell to move upwardly with respect to said piston, fish engaging members carried by said shell, means actuated by the upward movement of said shell for expanding said fish engaging members preparatory to contracting upon a fish, means for causing downward movement of said shell relatively to said piston, and means actuated by said downward movement for causing said fish engaging members to contract upon a fish.

5. A fishing tool comprising a piston and a shell adapted to be lowered into a well, fish engaging members associated with said piston and shell, hydraulic means controllable from the surface for causing relative movement between said piston and shell, and means actuated by such relative movement for causing said fish engaging members to contract upon a fish.

6. A fishing tool comprising a tube adapted to be attached to a drill tube, a piston carried by said tube, a shell slidable upon said piston, a chamber defined in said shell above said piston, ports formed in said tube for admitting fluid to said chamber from said drill tube, and fish engaging members adapted to be actuated upon movement of said shell relatively to said piston.

7. A fishing tool comprising a piston attachable to a drill tube, a shell slidable upon said piston and disposed thereabout, a chamber formed in said shell above said piston, fish engaging members pivoted to said shell, means carried by said piston for causing expanding movement of said fish engaging members upon upward movement of said shell and contracting movement upon downward movement of said shell, spring means for urging said shell into its lowermost position, and means for admitting fluid to said chamber for lifting said shell against the action of said spring means.

8. A fishing tool comprising a piston adapted to be attached to a drill tube, a shell disposed about said piston and slidable thereon, a chamber defined in said shell above said piston, a plurality of fish engaging members pivoted to said shell, a cam member carried by said piston adapted to engage said fish engaging members and cause their expanding and contracting movement upon upward and downward movement of said shell, means for admitting fluid to said chamber to cause upward movement of said shell, and means for causing downward movement of said shell.

9. A fishing tool comprising a piston adapted to be attached to a drill tube, a shell disposed about said piston and slidable thereon, a chamber defined in said shell above said piston, a plurality of fish engageing members pivoted to said shell, a cam member carried by said piston adapted to engage said fish engaging members and cause their expanding and contracting movement upon upward and downward movement of said shell, means for admitting fluid to said chamber to cause upward movement of said shell, and means for causing downward movement of said shell, said fish engaging members being provided with hooks adjacent their upper ends receivable upon said cam member when the lower ends of said fish engaging members are engaging a fish.

10. A fishing tool comprising a tube adapted to be secured to the lower end of a drill tube, a piston carried by said tube, a shell slidable upon said piston, a chamber defined in said shell above said piston, means for admitting fluid from said drill tube through said tube to said chamber, thereby causing upward movement of said shell, spring means for causing downward movement of said shell, valves permitting fluid to escape from said chamber when said shell is in its uppermost position, and fish engaging members carried by said shell adapted to be actuated upon upward movement of said shell to expand and upon downward movement of said shell to contract.

11. A fishing tool comprising a plurality of fish engaging members adapted to be lowered into a well by means of a drill tube, hydraulic means for causing said fish engaging members to expand, and means for contracting said fish engaging members.

12. A fishing tool comprising a plurality of fish engaging members adapted to be lowered into a well by means of a drill tube, hydraulic means for causing said fish engaging members to expand, and spring means for contracting said fish engaging members.

13. A fishing tool comprising a plurality of pivoted fish engaging members adapted to be lowered into a well by a drill tube, hydraulic means for causing said fish engaging members to expand while within the well, and spring means for causing said members to contract.

14. A fishing tool comprising a plurality of fish engaging members adapted to be connected to the lower end of a drill tube, hydraulic means for expanding said fish engaging members, and spring and cam means for contracting said members while within the well.

15. A fishing tool comprising a plurality of fish engaging members adapted to be lowered into a well by means of a drill tube, hydraulically operated means for causing said fish engaging members to be expanded, and spring and cam means for causing said fish engaging members to be contracted while within the well.

16. A fishing tool comprising a piston and a shell adapted to be lowered into a well, fish engaging members associated with said piston and shell, hydraulic means for causing said shell to move upwardly relatively to said piston, spring means for causing said shell to move downwardly in respect to said piston, cam means for causing said fish engaging members to expand upon upward movement of said shell, and cam means for causing said fish engaging members to contract upon downward movement of said shell.

In testimony whereof I have signed my name to this specification.

ERVIN H. McCLEASE.